United States Patent [19]

Alcocer

[11] Patent Number: 5,515,898
[45] Date of Patent: May 14, 1996

[54] OPERATING MECHANISM FOR AIRCRAFT WINDOW SHADES

[75] Inventor: Hector Alcocer, San Antonio, Tex.

[73] Assignee: A & C Products, San Antonio, Tex.

[21] Appl. No.: 363,530

[22] Filed: Dec. 23, 1994

[51] Int. Cl.$^6$ ...................................... E06B 3/94
[52] U.S. Cl. ........................ 160/84.02; 160/265
[58] Field of Search .................. 160/84.01, 84.02, 160/84.04, 84.05, 265, 107, 168.1 P, 405, 370.23, 35

[56] References Cited

U.S. PATENT DOCUMENTS 4,673,018  6/1987  Judkins.
4,679,610  7/1987  Spraggins.
4,762,159  8/1988  Ford.
4,998,576  3/1991  Moreno.

Primary Examiner—David M. Purol
Attorney, Agent, or Firm—Cox & Smith Incorporated

[57] ABSTRACT

A method and apparatus for effecting the opening and closing movements of a foldable, pleated shade for aircraft windows comprises the utilization of a single cord which has its ends oppositely mounted on two coaxial reels driven by a reversible electric motor. The energization of the motor in one direction effects the winding of the cord on one reel and the concurrent unwinding of the cord on the other reel. The intermediate portions of the cord are trained by suitable pulleys to form a vertical loop having the opposite sides of the loop disposed in parallel with the path of movement of the shade. A transverse operating member for the shade is then connected to one of the oppositely moving sides of the cord loop to effect the shifting of the shade from an open to a closed position, or vice-versa.

4 Claims, 5 Drawing Sheets

OPERATING MECHANISM FOR AIRCRAFT WINDOW SHADES

FIELD OF THE INVENTION

This invention relates to a method and apparatus for operating a shade of the foldable pleated type used in covering vehicle windows, such as the windows of an aircraft, and more particularly, to a reversible motor driven winch type operating mechanism for producing opening and closing movements of such shade.

SUMMARY OF THE PRIOR ART

Vehicle shades of the foldable pleated type have heretofore been employed to provide a movable coveting for aircraft windows. See U.S. Pat. No. 4,679,610 to Spraggins and U.S. Pat. No. 4,998,579 to Moreno. Each of these patents disclose mechanism for producing a raising or lowering movement of the shade through the operation of an electrical motor.

U.S. Pat. No. 4,762,159 issued to Ford, discloses a cable operating system for a venetian blind which may be driven by an electric motor having frictional contact with one of the guide pulleys around which the operating cord is trained. No prior art patents are known to Applicant wherein a cable drive system for raising or lowering the window shade is positively driven by a motor driven winch. There is a need, therefore, for a simple, economically manufacturable operating mechanism for positively driving a shade for an aircraft window to any desired position by an electric motor having a positive driving connection with the operating cables.

SUMMARY OF THE INVENTION

A window shade embodying this invention is mounted for vertical movement within the confines of a generally rectangular, perimetrical frame structure having two horizontally spaced, vertical frame elements, interconnected by two vertically spaced, horizontal elements. The shade is preferably of the foldable pleated type. One end of the shade, which may be either the top or bottom end, is secured to a horizontal frame element of the perimetrical frame structure, while the other end of the shade is secured to a transversely disposed, vertically movable, horizontal operating member. The open position of the shade, wherein the window is exposed, may be achieved by moving the movable end of the shade either upwardly or downwardly, as the case may be, to compress the pleats. Movement in the opposite direction will expand the folded pleats and cover the adjacent window. For reference convenience, the shade will be described as having its one end pleat secured to the upper horizontal element of the perimetrical, rectangular frame structure, while the other end of the shade is attached to the transversely disposed operating member, which moves downwardly to effect the closing of the shade and upwardly to effect the opening thereof. Those skilled in the art will recognize that the shade movement may be reversed to cover the window by an upward movement or by a horizontal movement, if desired.

In accordance with one embodiment of the invention, the two vertical elements of the rectangular, perimetrical frame each define a vertical surface. The two ends of the transverse operating member respectively abut and slide along the vertical surfaces.

The actuating mechanism for the foldable pleated shade may be mounted either adjacent the top or bottom of the horizontal frame element of the rectangular, perimetrical frame structure, depending upon whether the shade is to be raised to a dosed position or lowered to a dosed position or on one of the vertical frame elements for a horizontally movable shade.

As herein described, the upper horizontal frame element is provided with two winch input pulleys respectively mounted for rotation about horizontal axes. A motor support plate is also mounted on the horizontal frame element. A reversible electric motor and gear reduction unit is mounted on the motor support plate through a resilient pad to minimize transmission of motor noise and vibration to the window frame. The output shaft of the gear reduction unit drives a winch comprising two axially spaced reel elements.

A single operating cord is provided for operating the shade by the motor driven reel elements. One end of the cord is wound around and secured to the one reel element, and the other cord end is wound around and secured to the other reel element, but in rotationally reversed relationship to the first end. Thus, as the reel elements are rotated in a selected direction, the one end of the cord will be further wound on the one reel element while the other end of the cord is unwound from the other reel element. The two end portions of the operating cable extend respectively around the winch input pulleys and thus two intermediate portions of the cord are directed to opposite sides of the frame structure. Each of the upper corners of the frame structure have two co-axial guide pulleys mounted thereon and the intermediate portions of the cord are respectively trained around one of these guide pulleys and directed downwardly to a return pulley mounted in each lower corner of the frame structure. From the return pulley, the cord portions move upwardly along the respective vertical frame element to engage the other of the two co-axial guide pulleys and then extend across the bottom frame element to connect with the cord portion coming from the opposite corner of the frame.

From the foregoing description, it will be apparent that when the electrically operated driving motor for the two reels is energized, the cord is continuously moved throughout its length, and, adjacent each of the vertical elements of the frame structure, a vertical loop is formed in the cord wherein one portion of the cord loop is moving upwardly while another portion is moving downwardly.

The horizontally spaced ends of the vertically movable operating member for the shade are respectively connected to the two loop portions that are moving in the same direction. Thus, for one direction of rotation of the reels, both ends of the operating member will be concurrently moved upwardly relative to the vertical element, and, for the opposite direction of rotation of the reels, both ends of the shade operating member will be moved downwardly by the cord connection. The cord can, of course, be connected to the slidable members rather than directly to the shade operating member.

In an alternative embodiment, two separate cords are utilized. The first cord has the configuration of a block 8 and is trained over pulleys so that the movable transverse operating member for the shade will move in a truly vertical path regardless of where the actuating force is applied to such member. This "block 8" configuration is well known in the art and is shown in U.S. Pat. No. 5,082,043 to Moreno. The actuating force is then applied to only one end of the transverse operating member by a second cable which has its two ends respectively wound in opposite directions on two reels mounted on a common shaft which is driven by a reversible motor. The intermediate portion of this cord is trained by pulleys to run vertically adjacent one vertical frame element, then around a reversing pulley and then vertically to the level of the motor, thus forming a vertical loop. There are thus two oppositely moving cable portions disposed adjacent the vertical frame element. Either one of said oppositely moving intermediate cord loop portions is attached to one end of the transverse operating member for the shade and effects the upward or downward of the shade in accordance with the direction of rotation of the motor. Again, one end of the actuating cord is wound on its reel while the other end of the cord is unwound from the other reel. Thus the dual reel actuating mechanism can be readily applied to other types of cable actuating and leveling arrangements and provides the advantages of a positive motor drive of the actuating cord.

Further advantages of the method and apparatus of this invention will be apparent to those skilled in the art from the following detailed description, taken in conjunction wit the annexed sheets of drawings, on which are shown two embodiments of the invention.

DESCRIPTION OF THE PREFERRED EMBODIMENT

Figure 2:
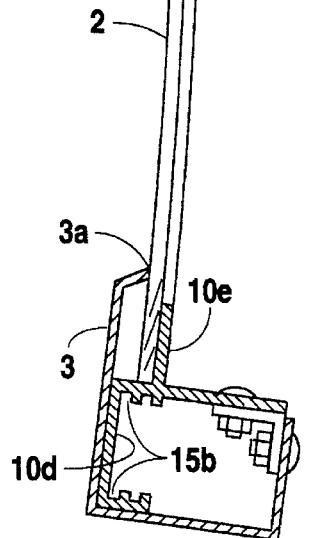
FIG. 2 is sectional view taken on the plane 2—2 of FIG. 1B.

Referring to the drawings, there is illustrated a folded pleated shade assemblage 1 of the type employed for aircraft windows. As is customary, shade assembly 1 is normally mounted intermediate an inner pane 2 (FIG. 2) of flexible transparent material, such as a polycarbonate sheet or that sold under the trademark "PLEXIGLAS" and an outer pane of glass or "PLEXIGLAS" (not shown), which conventionally forms part of the external surface of the aircraft, and is not illustrated. The inner panel 2, when conventionally mounted, is normally provided with a slight curvature to conform to the body contours of the aircraft. A plastic housing or shroud 3 (FIG. 2) conventionally overlies the shade assembly and has a central opening 3a to expose the window, but covers the shade frame and actuating mechanism.

A generally rectangular, perimetrical frame structure 10 is provided comprising two horizontally spaced, vertical frame elements 10a and 10b, and two vertically spaced, horizontal frame elements 10c and 10d, which are suitably interconnected at four corners by L-shaped brackets 13 to form a rigid perimetrical rectangle surrounding the inner transparent sheet 1a. The vertical frame elements 10a and 10b generally have a slight curvature.

Figure 3:
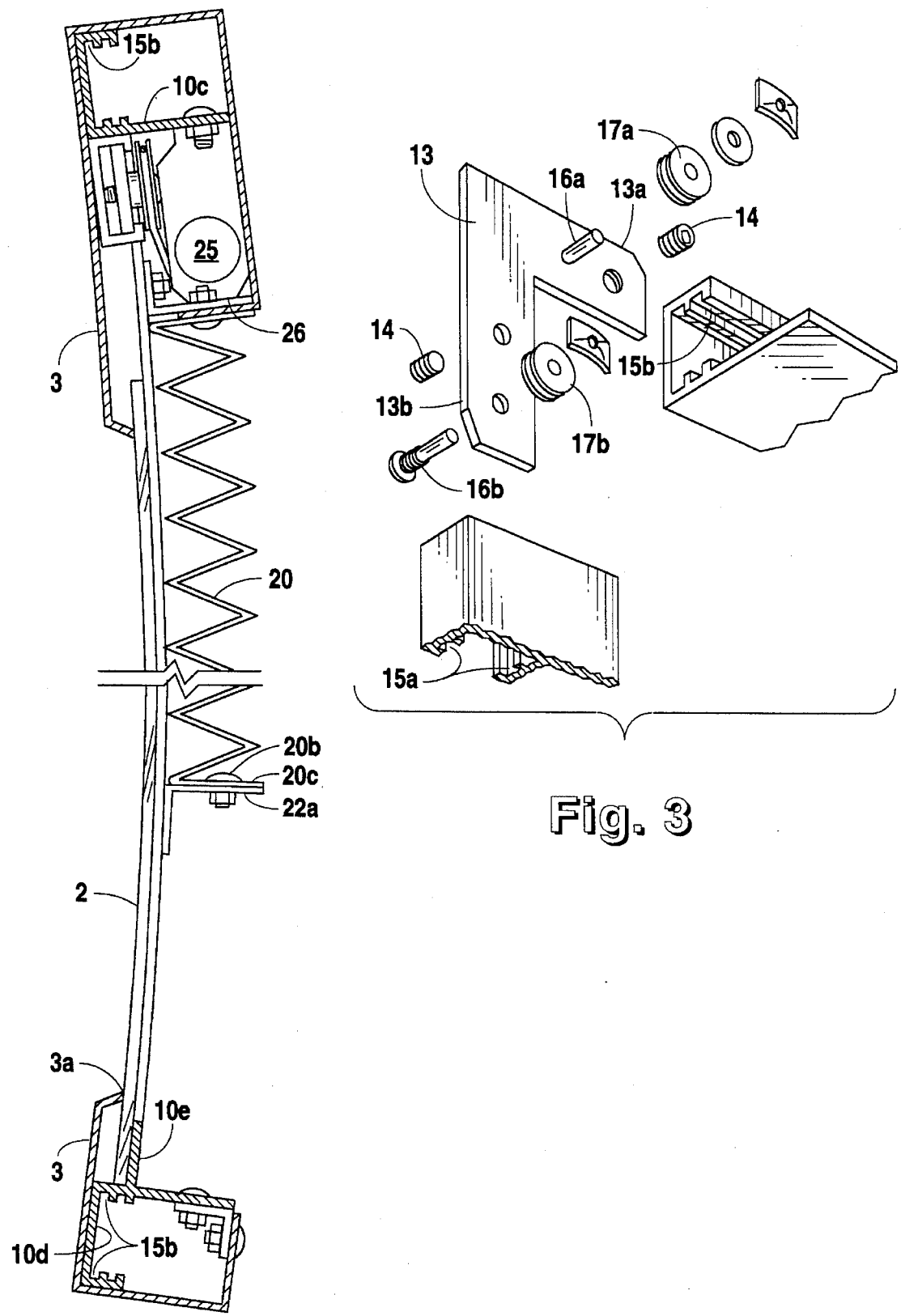
FIG. 3 is an exploded perspective view illustrating the corner securement of the horizontal and vertical frame elements.

The vertical frame elements 10a and 10b, as well as the horizontal frame elements 10c and 10d, preferably have identical cross sectional configurations and may be conveniently formed by cutting lengths from an extruded strip of aluminum which has the desired cross sectional configuration. Referring to FIG. 3, such cross sectional configuration includes vertical extending channels 15a in the vertical frame elements 10a and 10b and horizontally extending channels 15b in the horizontal frame elements 10c and 10d.

The leg 13a of connecting bracket 13 snugly fits within channel 15b and is rigidly secured therein by hollow bolt 14. Similarly, leg 13b of connecting bracket 13 snugly fits within channel 15a by another hollow bolt 14.

Each of the vertical frame elements 10a and 10b and the bottom horizontal frame element 10c have projecting flanges 10e that provide a peripheral backing for inner transparent sheet 2 which is clamped against flanges 10e by the plastic shroud 3.

Figure 1:
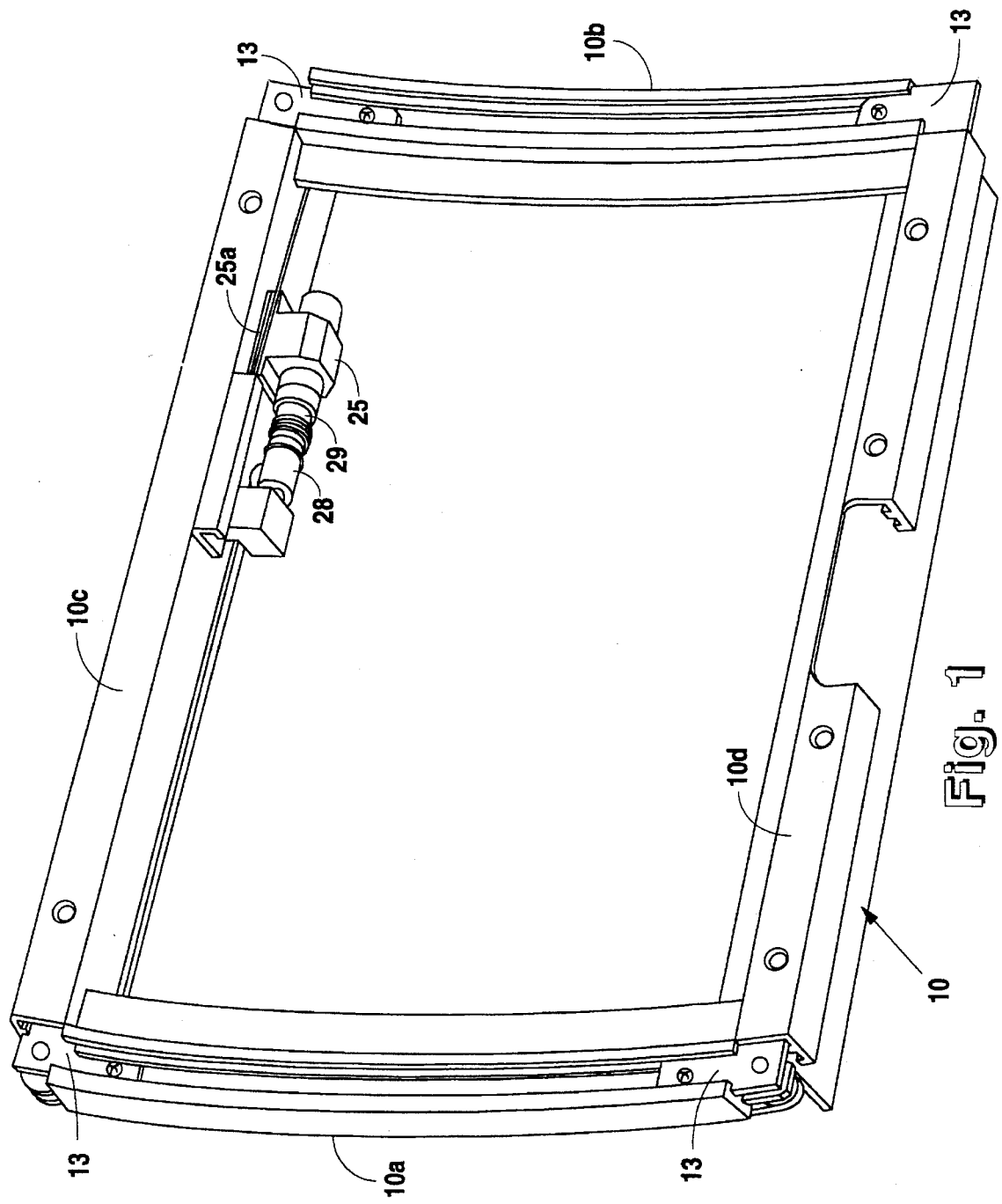
FIG. 1 is a perspective view of the frame elements of a pleated shade for an aircraft window with the shade omitted for clarity of illustration.
Figure 1A:
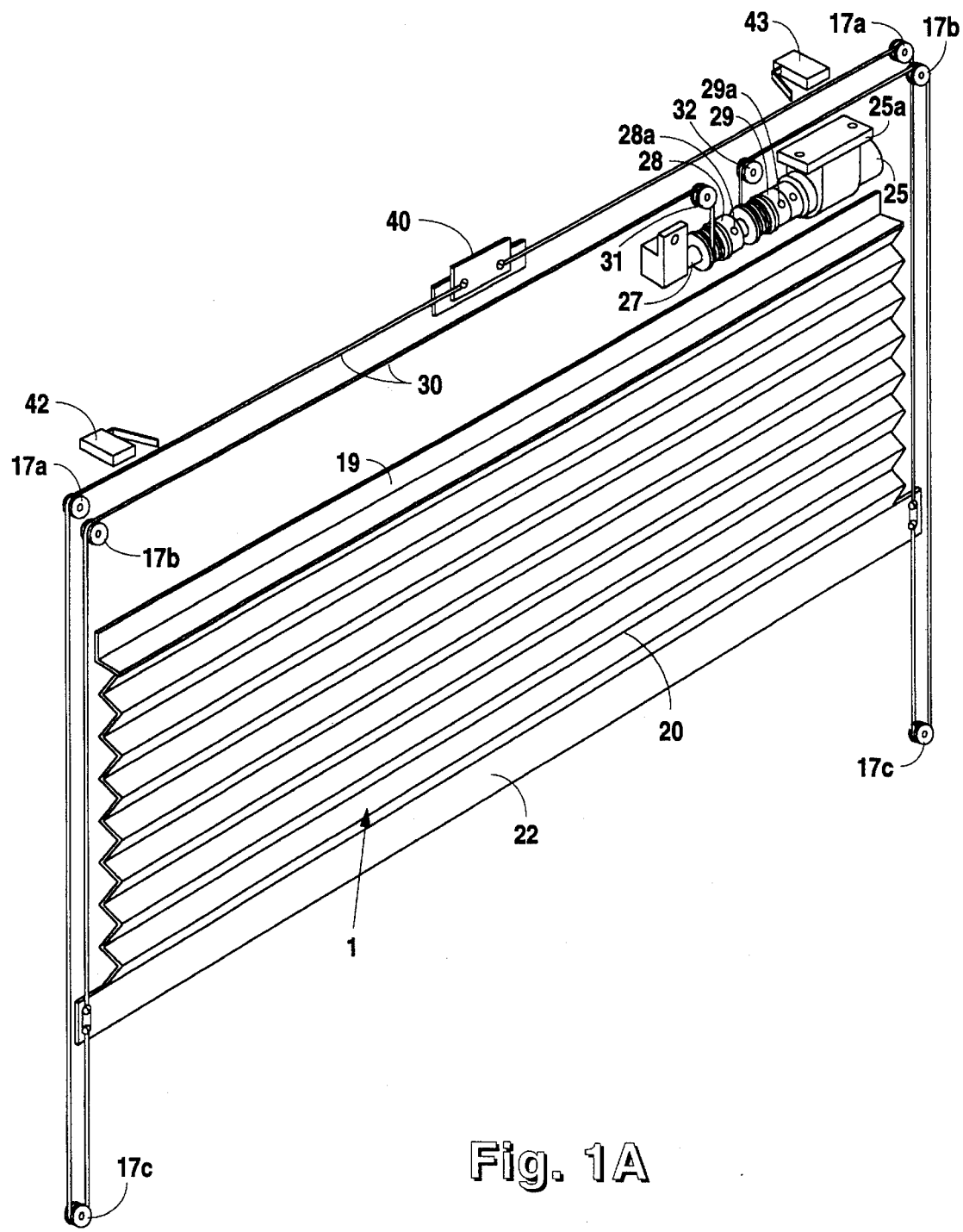
FIG. 1A is a schematic perspective view of the operating elements of a window shade actuating mechanism constituting one embodiment of the invention.
Figure 1B:
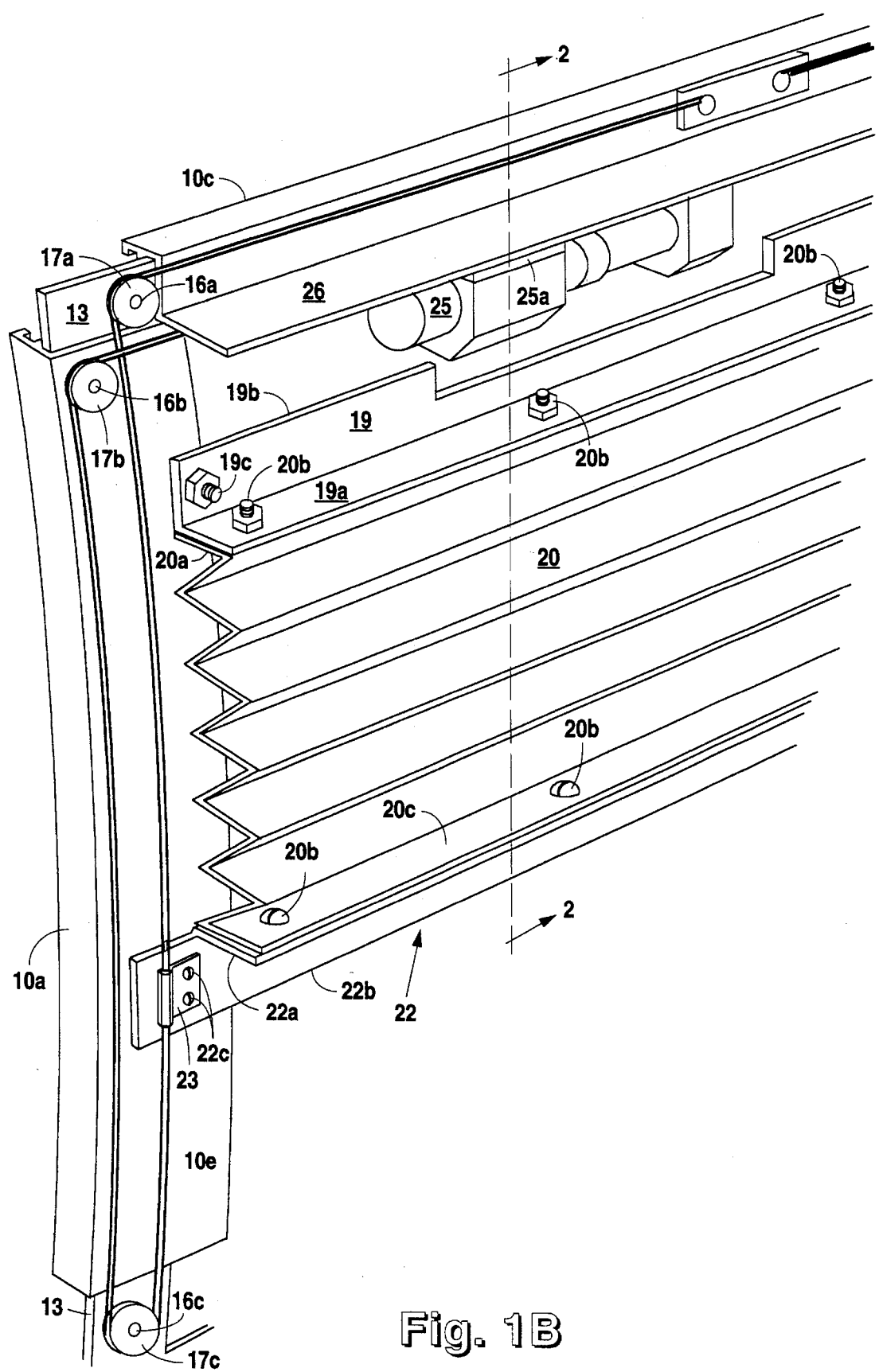
FIG. 1B is an enlarged scale partial, perspective view of the mounting of the shade in the frame of FIG. 1.

Additionally each of the upper brackets 13 provide mounting for two pulley shaft bolts 16a and 16b. Bolts 16a and 16b are threaded into the legs 13a and 13b of brackets 13 located in the two upper corners of the frame and rotatably mount a pair of guide pulleys 17a and 17b. Pulley shaft bolts 16c are threaded into the lower brackets 13 located in the two lower corners of the frame and each rotatably mounts a return pulley 17c (FIG. 1B)

A shade supporting member 19 (FIG. 1B) is bolted to vertical frame elements 10a and 10b beneath the upper horizontal frame element 10c. Shade supporting member 19 is of right angle cross sectional configuration having a horizontal flange 19a and a vertical flange 19b. Vertical flange 19b is secured to frame structure 10 by suitable bolts 19c.

A foldable pleated shade 20 has its one end pleat 20a detachably secured to horizontal flange 19a of shade support member 19 by a plurality of paper fasteners or bolts 20b. The other end pleat 20c of the foldable pleated shade 20 is similarly secured to the upper flange 22a of an angle shaped, shade operating member 22. Tab shaped ends 22b of the shade operating member 22 respectively abut and slide on flanges 10e of the vertical frame elements 10a and 10b. Cords clamps 23 are secured by screws 22c to the tab ends 22b. Hence, the shade operating member 16 is maintained in an abutting position relative to the vertical frame elements 10a and 10b and can move smoothly up and down, carrying the foldable pleated shade 20 between a closed extended position and an open contracted position (not shown) wherein the pleats 20c are disposed in abutment.

Those skilled in the art will recognize that the positions of the shade supporting member 19 and the shade operating member 22 can be reversed so that the shade is closed by pulling the operating member upward and is opened by pulling the operating member downwardly. If the shade is required to move horizontally, then the vertical frame elements 10a and 10b will be disposed in a horizontal position and the horizontal frame elements 10c and 10d will be disposed in a vertical position.

The shade operating method and apparatus to be described assumes that the shade supporting member 19 is secured adjacent the upper horizontal element 15d as stated above. Along the upper horizontal element 10c, the motor driven mechanism for operating the shade is mounted in conventional fashion, such as being bolted to a horizontal flange 26 intregally formed on upper horizontal frame element 10c. Such mechanism includes a reversible motor and a gear reduction mechanism 25, which in turn drives a shaft 27 upon which a pair of reels 28 and 29 are respectively coaxially secured, as by set screws 28a and 29a traversing the hub portion of such reels (FIG. 1). Motor 25 is conventionally secured to upper horizontal frame element 10c and seats on a resilient pad 25a to minimize noise and vibration.

A pair of reel guide pulleys 31 and 32 are conventionally mounted to the upper horizontal frame element 10c and respectively direct opposite ends of a cable or cord 30 onto the winch reels 28 and 29. Such cord ends are, however, oppositely wound on the two pulleys so that when the pulleys are driven by the motor 25, the one pulley will be winding the end of the cord 30 upon itself, while the other pulley will be unwinding the other end of the cord 30.

Cord 30 extends from the two guide pulleys 31 and 32 to a pair of pulleys 17b which are respectively mounted in the two upper corners of the frame structure 10. These pulleys direct the cord 30 vertically along the vertical frame elements 10a and 10b where the cord passes around return pulleys 17c. Cord 30 then extends upwardly to traverse the other corner pulleys 17a and 17b.

As previously mentioned, on both of the downwardly extending path portions of the cord 30, a cord clamp 23 is secured which is in turn secured to the shade operating member 22. Thus, a movement of the cord 30 in a selected direction will move both ends of the shade operating member 22 concurrently, either upwardly or downwardly, depending on the direction of energization of the motor 25.

If desired, a pair of limit switches 42 and 43 may be mounted adjacent the horizontal path of the cord 30 between the corner pulleys 17a. An actuator 40 is then secured to that portion of the cable 30 which normally lies between the limit switches, and the limit switches are conventionally connected in the energization circuit of the motor 25 to de-energize the motor when the shade reaches either its extreme open or its extreme closed position.

It should be particularly noted that both ends of the shade operating member 22 are concurrently moved by the More described arrangement. The amount of tension in the cord 30 may be conveniently adjusted by loosening the set screw 28a or 29a on one of the reels 28 and 29 and turning the reel until the desired amount of tension is imparted to the cord 30, then refastening the set screw.

It may be desirable to apply the method of this invention to existing shade operating structures wherein the actuating force is applied to only one end of the shade operating member and a separate cord arrangement is provided to maintain the operating member for the shade in a horizontal position as the shade is raised or lowered as the case may be.

Figure 4:
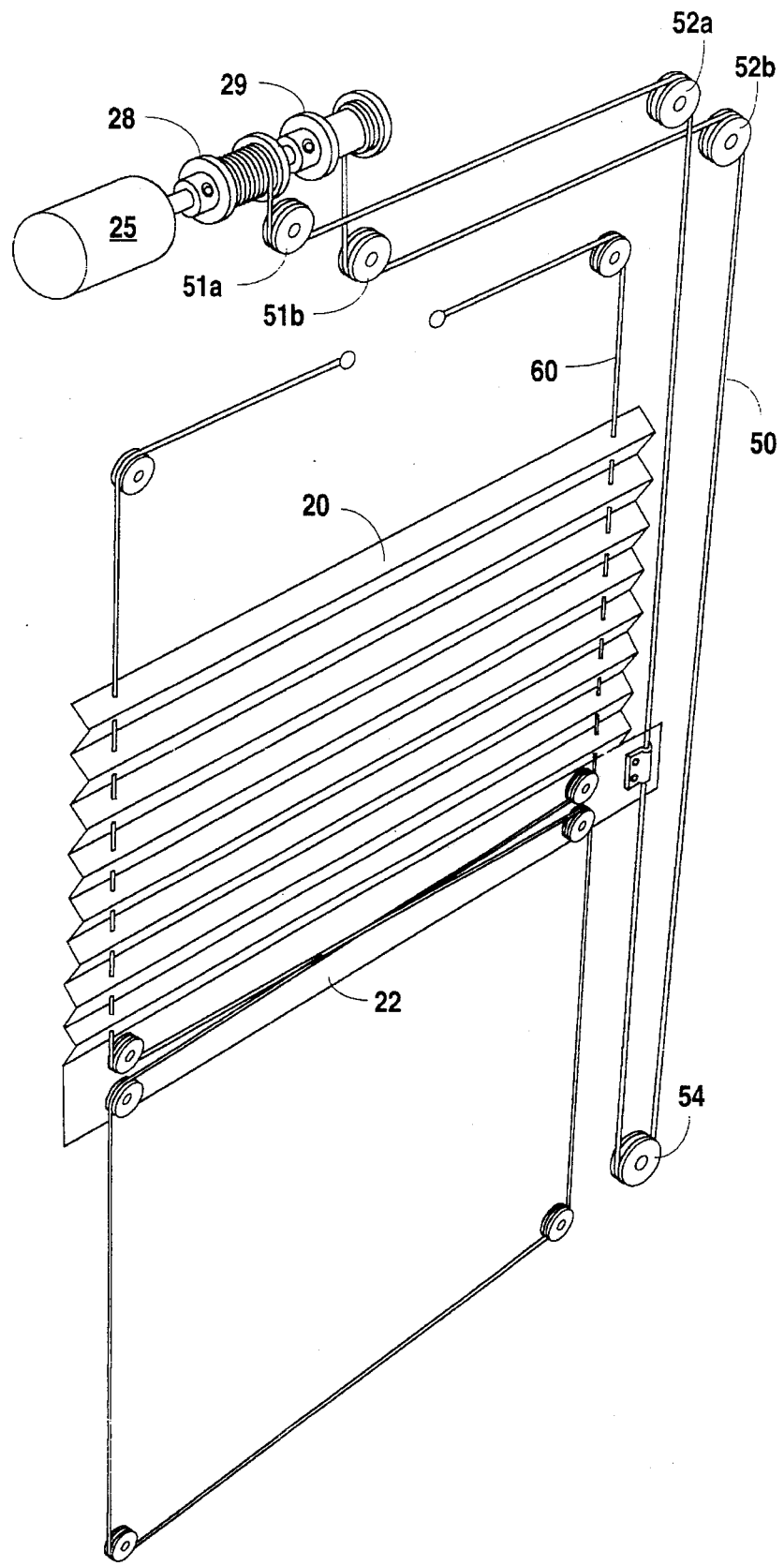
FIG. 4 is a schematic view of a modified shade actuating mechanism embodying this invention.

Referring to FIG. 4, there is shown an embodiment of this invention which can be applied to the shade operating mechanism disclosed in Moreno U.S. Pat. No. 5,082,043. In this patent, the actuating force is applied by a first cable 50 to the shade operating member 22 by a single connection to one end of the shade operating member. The shade operating member is maintained in a horizontal position, however, through the utilization of a second cable 60 which is attached to the shade along a generally block 8-shaped path. The detailed construction and operation of this alignment means in found in Column 3, lines 21–28 of the aforesaid Moreno patent and no further explanation thereof is necessary.

In the motor driven shade operating mechanism schematically shown in FIG. 4, it is presumed that the alignment means of the Moreno patent is employed. The cable 50 for operating such shade is attached to just one side of the shade operating member 22. As in the previous modification, the opposite ends of the cable 50 are respectively wound on the motor driven reels 28 and 29 in opposite directions. Reel guide pulleys 51a and 51b direct the cable 50 to two corner pulleys 52a and 52b. From there, the cable 50 moves downwardly and circles the return pulley 54 which is mounted in the lower corner of the frame structure (not shown), thus forming a vertical loop. The operation of the shade is thus accomplished by the motor driven pair of reels in the same manner as described in connection with the first embodiment of the invention. As the cable is wound on one reel, it is unwound from the other and the cable movement is transmitted to one edge of the shade operating member 22.

From the foregoing description, it is apparent that this invention provides convenient, economical method and apparatus for effecting the operation of a pleated shade for aircraft windows or other vehicles by a reversible electric motor. Further modifications of this invention will be readily apparent to those skilled in the art, and it is intended that all such modifications will fall within the scope of the appended claims.

I claim:

1. The method of operating a foldable, pleated shade for an aircraft window comprising the steps of:

providing a generally rectangular, perimetrical frame structure encompassing the shade and defining two horizontally spaced, vertical elements connecting at their top and bottom ends with two vertically spaced, horizontal elements;

securing one end pleat of said shade to said frame structure adjacent one of said horizontal elements of said frame structure;

securing the other end pleat of the shade to a horizontal operating member;

mounting two adjacent cord guide pulleys respectively in each of two horizontally opposed corners of said frame structure for rotation about horizontal axes;

mounting a return pulley in each of the other horizontally opposed corners of said frame structure for rotation about a horizontal axis;

mounting a reversible motor driven winch on one of said frame elements, said winch having two axially spaced cord receiving reels;

wrapping opposite ends of a continuous cord respectively onto said reels so that rotation of said reels effects the winding of one cord end and concurrently the unwinding of the other cord end, thereby effecting the movement of the entire length of said continuous cord in a selected direction determined by the rotational direction of said reversible motor;

training the intermediate portions of said continuous cord around said guide pulleys and said return pulleys to produce oppositely moving vertical cord portions adjacent each of said vertical elements by rotation of said winch; and respectively securing one of each said oppositely moving cord portions to the adjacent end of said shade operating member, thereby moving said shade vertically in a direction determined by the direction of the rotation of said reversible motor.

2. A vertically movable shade for a window in a vehicle wall, comprising, in combination;

a generally rectangular rigid frame structure constructed and arranged to peripherally encompass the vehicle window when secured to the interior of the vehicle wall;

said frame structure having two-vertical elements and a horizontal element connecting two ends of said vertical elements;

a horizontal shade securement member extending between the other ends of said vertical channels;

a foldable pleated shade having one end pleat secured to said shade securement member;

a horizontally extending shade operating member secured to the other end pleat of said foldable shade, whereby vertical movement of said shade operating member in one vertical direction folds said foldable shade into a compressed, open position, and vertical movement of said shade operating member in the opposite vertical direction unfolds said foldable shade to a closed position covering the vehicle window;

a reversible electric motor driven winch mounted on said frame structure adjacent said horizontal element;

said winch having two coaxially adjacent cord winding reels;

a continuous cord having its two ends respectively secured to said cord winding reels in reversed relation, whereby rotation of said reels concurrently produces a winding of one cord end and an unwinding of the other cord end, thereby moving the entire length of said cord by rotation of said winch;

guide pulley means on each of said vertical elements for training the intermediate portions of said cord into a vertical loops respectively adjacent said vertical elements with one side of each loop moving upwardly while the other side moves downwardly by rotation of said winch;

means for respectively securing the ends of said shade operating member to sides of said loops moving in the same direction, whereby rotation of said winch in one direction produces an upward movement of the shade, and rotation of said winch in the opposite direction produces a downward movement of said shade;

said guide pulley means comprising two adjacent guide pulleys mounted in the end of each said vertical element adjacent said horizontal element, and a return guide pulley mounted adjacent the other end of each said vertical element; and the intermediate portions of said cord respectively extending from one of said winch reels, around one of said two guide pulleys, vertically along the respective vertical element, around said return guide pulley, thence vertically along the respective vertical element, around the other said guide pulley, horizontally to one of the two guide pulleys on said other vertical element, thence vertically adjacent said other vertical element to said return pulley in said other vertical element, then vertically to the second said guide pulley mounted at said one end of the said other vertical element and horizontally back to the other of said winch reels.

3. The apparatus of claim 2, further comprising a pair of slide members respectively mounted on said vertical elements; and means for respectively securing the ends of said shade operating member to said slide members.

4. The apparatus of claim 2, further comprising a pair of limit switches mounted in spaced relation along the path of said intermediate portion of said cord;

means connecting said limit switches to said reversible electric winch motor to interrupt current supply thereto when either of said microswitches are actuated; and switch actuator means secured to said intermediate portion of said cord and engagable with one of said limit switches when said pleated shade reaches its closed position, and engageable with said other limit switch when said shade reaches its said open position.

* * * * *